US009536156B2

(12) United States Patent
Wey et al.

(10) Patent No.: US 9,536,156 B2
(45) Date of Patent: Jan. 3, 2017

(54) ARRANGEMENT AND METHOD FOR RECOGNIZING ROAD SIGNS

(71) Applicant: Ford Global Technologies, LLC, Dearborn, MI (US)

(72) Inventors: Torsten Wey, Moers (DE); Gerald Doerne, Cologne (DE); Dirk Gunia, Leichlingen (DE); Marc Roeber, Dusseldorf (DE); Christoph Schlaug, Ingelbach Reinland-Pfalz (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/260,505

(22) Filed: Apr. 24, 2014

(65) Prior Publication Data

US 2014/0300741 A1    Oct. 9, 2014

Related U.S. Application Data

(63) Continuation of application No. 13/205,891, filed on Aug. 9, 2011, now Pat. No. 9,218,535.

(30) Foreign Application Priority Data

Aug. 23, 2010 (DE) .................. 10 2010 039 634

(51) Int. Cl.
*G08G 1/00* (2006.01)
*G08G 1/0967* (2006.01)
(Continued)

(52) U.S. Cl.
CPC ....... *G06K 9/00818* (2013.01); *G06K 9/00791* (2013.01); *G08G 1/0962* (2013.01);
(Continued)

(58) Field of Classification Search
CPC ............ G08G 1/0962; G08G 1/096716; G08G 1/09675; G08G 1/163; G08G 1/096725; G08G 1/0967; G08G 1/096741; G08G 1/164; G06K 9/00791; G06K 9/3241
(Continued)

(56) References Cited

U.S. PATENT DOCUMENTS 6,472,977 B1 * 10/2002 Pochmuller ................ 340/425.5
6,801,638 B1   10/2004 Janssen et al.
(Continued)

FOREIGN PATENT DOCUMENTS

DE    29610677 U1    9/1996
DE    19829162 A1    1/2000
(Continued)

OTHER PUBLICATIONS

German Patent & Trademark Office, German Exam Report for corresponding German Patent Application No. 10 2010 039 634,6 mailed Apr. 20, 2012.
(Continued)

*Primary Examiner* — Jason Holloway
(74) *Attorney, Agent, or Firm* — Jennifer Stec; Brooks Kushman P.C.

(57) ABSTRACT

Various embodiment include a system and a method for recognizing road signs. An image of a road sign may be captured by least one image sensor. A vehicle computer may receive the image data representing one or more road signs along a route and display one or more images of the road sign based on the image data. The display may be capable of presenting one or more status of the road sign based on one or more travel states for the vehicle. These travel states may include at least one of an amount of elapsed travel time, distance travelled, or speed.

6 Claims, 3 Drawing Sheets

(51) Int. Cl.
*G06K 9/00* (2006.01)
*G08G 1/0962* (2006.01)
*G06K 9/32* (2006.01)
*G08G 1/16* (2006.01)

(52) U.S. Cl.
CPC ....... *G08G 1/0967* (2013.01); *G08G 1/09623* (2013.01); *G08G 1/096716* (2013.01); *G06K 9/3241* (2013.01); *G08G 1/096783* (2013.01); *G08G 1/163* (2013.01)

(58) Field of Classification Search
USPC ....... 340/901, 904, 905, 908, 933, 936, 937, 340/939, 995.13, 995.27; 701/1, 116–119, 701/414, 423, 426, 429, 432
See application file for complete search history.

(56) References Cited

U.S. PATENT DOCUMENTS

| | | | | |
|---|---|---|---|---|
| 7,058,206 | B1* | 6/2006 | Janssen et al. | 382/104 |
| 7,068,844 | B1* | 6/2006 | Javidi et al. | 382/218 |
| 8,131,018 | B2* | 3/2012 | Wilson | 382/104 |
| 8,238,963 | B1* | 8/2012 | Fujisaki | 455/550.1 |
| 2004/0010352 | A1* | 1/2004 | Stromme | 701/1 |
| 2006/0034484 | A1* | 2/2006 | Bahlmann et al. | 382/103 |
| 2006/0262312 | A1* | 11/2006 | Retterath et al. | 356/445 |
| 2009/0074249 | A1* | 3/2009 | Moed et al. | 382/104 |
| 2009/0169055 | A1* | 7/2009 | Ishikawa | 382/104 |
| 2009/0312888 | A1* | 12/2009 | Sickert et al. | 701/1 |
| 2010/0302361 | A1* | 12/2010 | Yoneyama et al. | 348/135 |

FOREIGN PATENT DOCUMENTS

| | | |
|---|---|---|
| DE | 102004042382 A1 | 3/2006 |
| DE | 102008043743 A1 | 5/2010 |
| EP | 1131803 A1 | 9/2001 |
| EP | 1826736 A1 | 8/2007 |
| JP | 2008287379 A | 11/2008 |

OTHER PUBLICATIONS

Chinese Patent Office, First Office Action for the corresponding Chinese Patent Application No. 201110238106.1 mailed Sep. 28, 2014.

Chinese Patent Office, Second Office Action for the corresponding Chinese Patent Application No. 201110238106.1 mailed May 18, 2015.

* cited by examiner

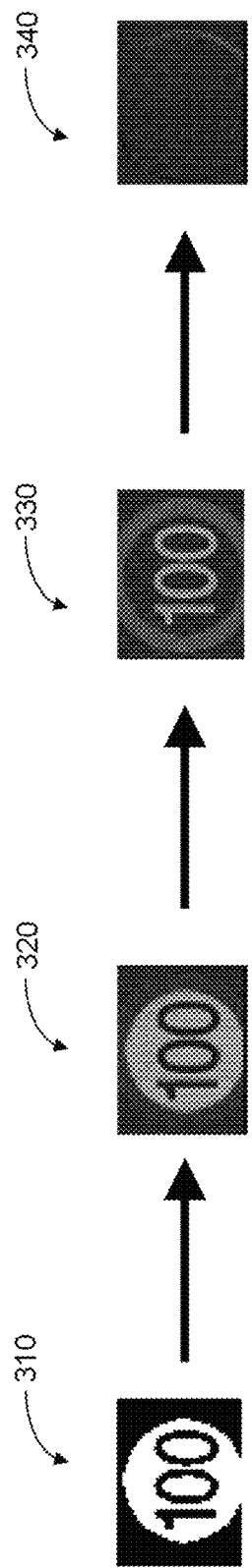
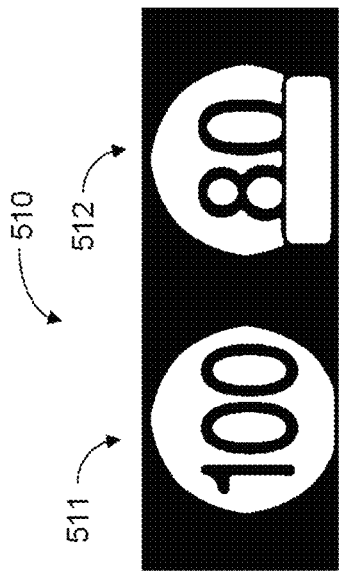
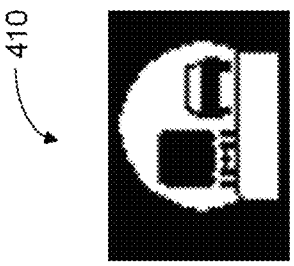
Fig. 3
Fig. 5
Fig. 4

ARRANGEMENT AND METHOD FOR RECOGNIZING ROAD SIGNS

CROSS-REFERENCE TO RELATED APPLICATION

This application is a continuation of U.S. application Ser. No. 13/205,891, filed Aug. 9, 2011, now U.S. Pat. No. 9,218,535, issued on Dec. 22, 2015, which claims priority to DE 10 2010 039 634, filed Aug. 23, 2010, which applications are hereby incorporated by reference in their entirety.

TECHNICAL FIELD

One or more embodiments relates to a system and a method for recognizing road signs.

BACKGROUND

Various systems are known for assisting the driver of a motor vehicle in carrying out automated recognition of road signs. Such recognition may be accomplished by using suitable devices for perceiving or detecting the surroundings. Such systems are available commercially both by various original equipment manufacturers (OEMs), typically in Europe, and by manufacturers of portable navigation devices (PNDs). The PND systems are based on GPS signals and, in some embodiments, on Galileo signals, in conjunction with map data for supplying the driver with information relating to road signs. A number of systems already use a camera device for improving the recognition accuracy and robustness. The manufacturers of vehicles use front-mounted camera devices and means for combining signals with data relating to the driving state of the vehicle. A further option is means for combining signals with navigation devices.

The above approaches have various disadvantages. As an example, it is not possible to recognize all road signs with accuracy. In these cases, a good recognition rate may be implemented for speed limit road signs and road signs prohibiting overtaking. However, road signs which are not consistent with traffic regulations, where such regulations exist (e.g., in Germany with the Viennese Road Traffic Convention), road signs are not recognized or are recognized with only a limited recognition rate. With respect to speed information, speed limits which are implicitly contained cannot be recognized by means of an optical device. Furthermore, situations also occur in which the surroundings cannot easily be assessed without the aid of the human eye. For example, when a plurality of road signs or contradictory road signs are present, and when road signs are missing it is not possible for satisfactory recognition or analysis to take place. In addition, GPS-based or Galileo-based information may be subject to a decreasing recognition rate over time. There is frequently also a need to avoid the combination of two or more recognition devices, with the use of a single device for recognizing the surroundings also being desirable for reasons of cost.

EP 1 826 736 B1 discloses a motor vehicle having a device for recognizing road signs, wherein, depending on the probability of the correctness of the sensing of a road sign or its regulatory content, the outputting of a representation of the road sign in a display can vary between a first output form with relatively low probability and a second output form with relatively high probability.

EP 1 131 803 B1 discloses a device and a method for recognizing road signs, image data of an image sensor being analyzed and classified in an information processing unit in order to determine whether the image data of the image sensor contain objects which have a sufficient probability of being road signs. These objects are then fed to a further processing and classification means, wherein separation into road-sign specific upper classes and lower classes is performed. Class-specific feature data are then replaced by corresponding image data that is stored in a memory unit or by image data originating from the image sensor as a function of whether said feature data has been recognized with a high probability during the classification, and the image data resulting from this replacement are combined to form a synthetic image of a road sign which is stored in the memory unit and displayed in the display unit. In this context, the display unit can contain, inter alia, a setting unit by means of which the maximum duration of the display of the synthetic image is set. Furthermore, the display unit can be controlled in such a way that it displays the synthetic image until a predefined distance has been traveled.

DE 296 10 677 U1 discloses an arrangement for displaying road signs, which arrangement has, in addition to a display face for displaying messages to the driver, a signal transmitter which activates the display as a function of the distance traveled, and makes the display visible or deletes it again.

DE 198 29 162 A1 discloses the use of an electronic camera and of an image recognition device cooperating therewith, for the purpose of recognizing road signs, wherein the image recognition device can be reset to its starting state if, the vehicle turns off the road, for example after a road sign indicating a speed limit.

SUMMARY

One aspect of the various embodiments is a system and a method for recognizing road signs, which effectively permits the most reliable possible transmission of road sign information.

In a system and method for recognizing road signs in a motor vehicle, at least one image sensor and a user interface device which processes image data received from the image sensor and contains road sign information may take into account the travel situation and/or the surroundings of the motor vehicle. The processed road sign information may be transmitted to a driver of the motor vehicle. The user interface device may be configured to process the road sign information with respect to the reliability status of the road sign information. The display to the driver in the vehicle may be different depending on the reliability status. The reliability status may be based on one or more of an amount of time that has elapsed or a distance travelled.

The various embodiments of invention may be based on, for example, the concept of configuring a human machine interface (HMI), referred to here and below generally as an interface device, in such a way that the driver information is improved by taking into account the information above. Here, an image sensor, such as a camera (e.g., a front-mounted camera) may be provided as a further piece of equipment, and the interface device may receive information on the basis of the data received by the front-mounted camera and information relating to the travel situation and/or the driving surroundings. The interface may present (e.g., display) the data to the driver in a suitable way. The interface device which is used in the method and device may enable a correct display of road sign information over a long travel distance and with a high recognition rate.

In at least one aspect, a system for displaying road signs along a route in a vehicle comprises at least one vehicle computer configured to receive image data representing one or more road signs along a route. The at least one vehicle computer may be further configured to display one or more images of the road sign based on the image data. The display may be capable of presenting one or more aging statuses for the road sign based on at least one of an amount of elapsed travel time, distance travelled, or speed.

In at least a second aspect, a system for displaying road signs along a route in a vehicle includes one or more vehicle image sensors and at least one vehicle computer. The images sensors may be configured to capture one or more images of road signs along a route. The at least one vehicle computer may be configured to receive the captured image of the road signs along a route and display one or more images of one or more road signs based on at least one of an amount of elapsed travel time, distance travelled, or speed of the vehicle. The amount of elapsed travel time, distance travelled, or speed of the vehicle may correspond to an aging status of the road sign such as (and without limitation) a time since the detection of the road sign or a distance since the detection of the road sign.

In at least a third aspect, a method includes receiving at a vehicle computer image data representing one or more road signs detected along a route. The method also includes displaying at the vehicle computer one or more images of the road signs based on the image data. The method may also include displaying one or more statuses for the detected road sign at the vehicle computer based on one or more travel states for the vehicle including at least one of an amount of elapsed travel time, distance travelled, or speed.

The various embodiments will be explained in more detail below on the basis of the various embodiments and with reference to the appended figures.

BRIEF DESCRIPTION OF THE DRAWINGS

FIGS. 3-5 show examples of road sign information which may be displayed to a driver according to the various embodiments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
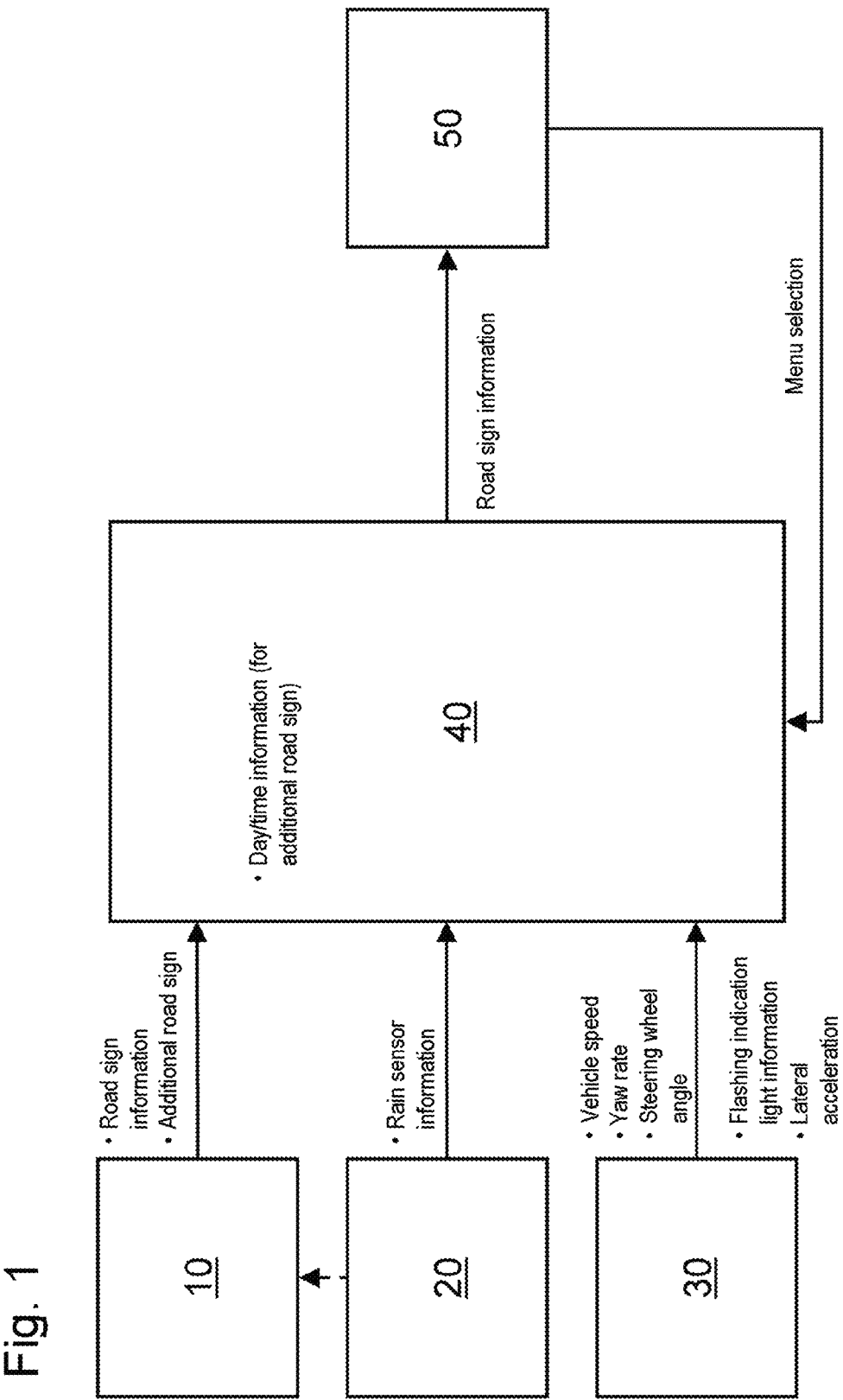
FIG. 1 shows a block diagram illustrating the data flow for road sign detection.

FIG. 1 is a block diagram illustrating a system for detecting road signs. The system may have at least one image sensor 10, which may be a front-mounted camera, and a user interface device 40 which may process image data received from the image sensor 10 and containing road sign information. The processing by the user interface device 40 may include inputs relating to travel information (block 30) such as (and without limitation) vehicle speed, yaw rate, steering wheel angle, and the like. Alternative or additional inputs may relate to the surroundings of the motor vehicle (block 20) such as (and without limitation) information obtained from environment detecting sensors (such as rain sensor information). The user interface device 40 may present (e.g., display) the processed road sign information to a driver 50 of the motor vehicle. Non-limiting examples of a subgroup of road signs that may be detected may include, and are not limited to, speed limits and through-road restrictions including information relating to a possible additional road sign or a restrictive condition.

Implicit speed limits may not be recognized without the navigation-supported data. Frequently, the cancelling of speed limits is also not expressly stated but rather depends on certain additional road signs and/or restrictive conditions of the speed limit, such as for example a distance of validity.

The reliability of the speed limit sign may be presented on the interface device. This reliability may be dependent on, for example, the content of the road sign and on the travel situation of the vehicle. In some embodiments, the reliability of the road sign may be represented by displaying the road signs in different colors, intensity and/or other visible attributes.

FIG. 3 shows a non-limiting example of the reliability status change for a road sign. As illustrated in FIG. 3, the respectively displayed road signs 310, 320, 330, 340 have decreasing intensity with the change in reliability status. The reliability status may be based on distance travelled, an amount of time elapsed, and/or vehicle dynamics information (e.g., movement of the vehicle). In some embodiments, the amount of time elapsed may be predefined. As sometimes used herein, the reliability status as presented to the driver is referred to as "aging." Thus, in FIG. 3, each road sign may have decreasing intensity as the aging changes.

Figure 2:
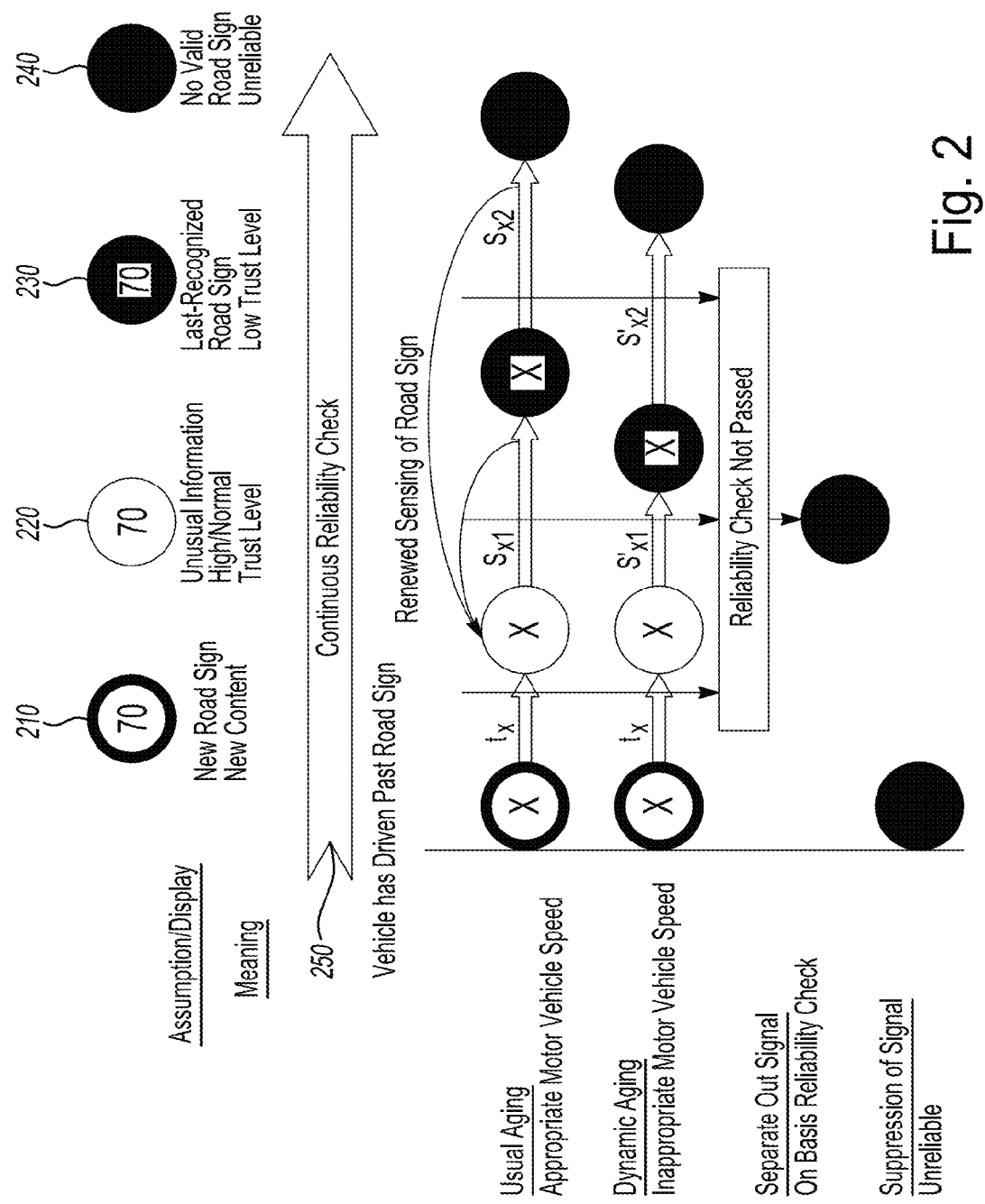
FIG. 2 shows a schematic illustration illustrating the process for recognizing road signs.

In one embodiment, a three-stage system may be used representing the events or triggers that cause a road sign reliability status change. As shown in FIG. 2, one stage may be defined by a time period as represented by $t_x$. A second stage may be defined by a distance traveled as represented by $s_{x1}$. A third stage may be a distance traveled as represented by represented $s_{x2}$. Of course, the system may include any number of aging stages including, for example, a continuous course of aging, e.g. the displayed road signs then become pale in a predefined time. Thus, the three stages are provided for illustration.

The aging (e.g., based on an aging time and/or aging distance at which point the next road sign status may be displayed) may be defined in different ways depending on the road sign. For example, high speed limits may be valid for longer distances than relatively low speed limits. Since a distance "d" effects reliability, the vehicle speed on the freeway may be carried over into equation (1) in order to modulate the timing indicated in FIG. 2:

$$t_{1,2}(X,\bar{v}) = s_{1,2}/\bar{v}_{vehicle} \qquad (1)$$

where $s_1(X,\bar{v}) = c_1(X) - b_1(\bar{v},X,Z);$ \qquad (2)

$c_1 \geq b_1$ and $s_2(X,\bar{v}) = c_2(X) - b_2(\bar{v},X,Z);$ \qquad (3)

$c_2 \geq b_2$

Here, $v_{vehicle} \equiv v$ denotes the average vehicle speed in the time interval $t_{1,2}(X,\bar{v})$, and $s_{1,2}$ denotes the distances for the respective state of aging. X represents the type of road sign and Z represents a possible additional road sign.

In one or more embodiments, dynamic aging of the road signs occurs in the interface device 40, as is described above.

For example, depending on the recognized speed limit road signs and the speed, the amount of time elapsed may be adapted dynamically if, for example, the maximum or average value of the speed is significantly higher for a defined distance than the speed indication recognized in the speed limit road sign. In this case, there may be a higher probability that the road sign may be valid for another lane (e.g., an exit lane) so that the time for changing the reliability status is reduced. This leads to a nonlinear relationship between the time and the vehicle speed. This behavior is taken into account in equations (2) and (3) by the second term and is correspondingly weighted with the variable b.

The dynamic aging of the road signs as shown in the interface device 40 is represented in the diagram illustrated in FIG. 2. $t_x$ denotes the time-based display duration of respective specific road sign, $s_{x1}$ and $s_{x2}$ denote the distance-based display duration of the respective specific road sign, and $s'_x$ and $s'_{x2}$ denote the distance-based display duration with respect to the respective specific road sign and the vehicle speed.

At times, a route may include a succession of speed limits. In such embodiments, a succession of speed limits with decreasing speed indications within a specific distance may be treated as speed limits which are related to an exit. The reliability status may, for example, change to a relatively low state 230 if the vehicle movement dynamics information indicates that the exit has not been taken or is used for exiting the respective road.

If vehicle information (for example traveling direction indicator, yaw rate, and the like) indicates that the vehicle is out of the current traffic situation (for example turning off), the indicated speed limit and overtaking prohibition road signs may be deleted 240. This behavior is illustrated in FIG. 2 by a reliability check 250.

In some embodiments, displaying changing road signs may be suppressed if specific road signs are detected, for example a speed limit zone of 30 km/h (or miles-per-hour). It will be appreciated that the unit of measurement for speed can vary depending on the specific implementation of the invention.

In order to be able to inform the driver in an appropriate and clear way that new road signs have been found by the front-mounted camera 10, the intensity of the illustrated road signs in the interface device 40 may be increased for a defined time and/or the displayed road sign can flash in order to attract the driver's attention better. Such a status level is represented in FIG. 2 with road sign status 210.

In order to supply the driver with additional information about the content of the road sign, the occurrence of additional road signs and/or of restrictive conditions may be detected by the front-mounted camera 10 and displayed to the driver. In particular, at least the "yes/no" information relating to the presence of an additional road sign or a condition can be recognized and displayed as demonstrated in FIG. 4.

At times, a plurality of road signs, in particular speed limits and through-road restrictions, may be attached to the same road sign mast. Detecting the most significant of these road signs may be difficult in so far as this question can be dependent on the current travel situation and environmental conditions (for example in the case of rain different speed limits may apply than in the case of a dry roadway). In order to allow for this situation and to provide the driver with more information relating to the identified road signs, a dual interface device may be provided which has, as shown in FIG. 5, two road sign locations 511 and 512 in a dual display 510. Both road sign locations 511 and 512 may be processed independently of one another such that each has different aging times and aging strategies. The aging proposed above can also act independently on the two road signs shown.

If the camera 10 is capable of recognizing the reason for an additional road sign, it is also indicated in the HMI. The system may calculate different aging distances depending on the presence of an additional road sign and depending on the information contained in the additional road sign or in the condition. This behavior is taken into account in the equations (2) and (3) above in the second term by means of the dependence on Z.

Depending on the road signs recognized and the actual and/or current vehicle speed, the driver may be supplied with speed-exceeding information. The message may be given by flashing numbers on the road signs displayed on the display or on the dashboard.

In the case of two displayed road signs, it may be defined, e.g., by setting or adjustment, which of the two road signs (e.g., on the basis of the higher speed limit, the lower speed limit or the speed limit corresponding to the additional road sign) displays the warning about exceeding the speed. For example, the driver may select from a menu the difference between the speed according to the recognized road sign and the actual vehicle speed (e.g., positive or negative) about which he would like to receive a warning.

Information relating to additional road signs and aging can also be incorporated into the excessive speed warning such that, for example, an excessive speed warning may not be provided for aged road signs or road signs provided with additional road signs.

In some embodiments, if a road sign with an additional road sign is sensed and the additional road sign has been identified relating to wet roadways, information received from the rain sensor 20 may cause the display of the road sign information. This is illustrated in FIG. 4 in which the signal is received from the surroundings of the vehicle.

In some embodiments, if a road sign with an additional road sign is sensed and the additional road sign has been identified as a time restriction, information from a vehicle clock of the respective vehicle may or may not cause display of the time restriction road sign.

In some embodiments, if a road sign with an additional road sign is sensed and the additional road sign has been identified as a restriction to "icy conditions", temperature information received by vehicle may or may not cause display of the icy conditions road sign information.

In some embodiments, if a road sign with an additional road sign is sensed and the additional road sign has been recognized as a restriction relating to fog, information received from the tail fog-light may or may not cause display of the fog road sign information.

In some embodiments, if a road sign with an additional road sign is sensed and the additional road sign has been recognized as a restriction "for vehicle with trailers," information received from the trailer hitch may or may not cause display of the respective road sign information.

In some embodiments, if a road sign with an additional road sign is sensed and the additional road sign has been identified as a weight restriction, the weight information of the respective vehicle may or may not cause display of the road sign information.

In some embodiments, if a road sign with an additional road sign is sensed and the additional road sign has been identified as a restriction "only for trucks," configuration information about the respective vehicle may or may not cause display of the road sign information.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a vehicle image-sensor configured to capture road sign images along a route; and
   a vehicle-based computer, in communication with multiple displays, configured to:
   receive the captured road sign images;
   simultaneously display the road sign images on different of the displays;
   select one of: distance travelled, vehicle speed and elapsed travel time; and
   diminish intensity of the displayed images independently, corresponding to the selected one of distance travelled, vehicle speed and elapsed travel time.

2. The system of claim 1 wherein the vehicle image sensor is a front-mounted camera.

3. A computer-implemented method comprising:
   capturing road sign images using a vehicle image-sensor;
   receiving the captured road sign images;
   simultaneously displaying, using a vehicle computer, the road sign images on different vehicle displays;
   selecting one of: distance travelled, vehicle speed and elapsed travel time; and
   diminishing intensity of the displayed images independently, corresponding to the selected one of distance travelled, vehicle speed and elapsed travel time.

4. The method of claim 3 wherein the vehicle image sensor is a front-mounted camera.

5. A non-transitory computer readable storage medium, storing instructions that, when executed by a vehicle computer, cause the computer to execute a method comprising:
   capturing road sign images using a vehicle image-sensor;
   receiving the captured road sign images;
   simultaneously displaying the road sign images on different vehicle displays;
   selecting one of: distance travelled, vehicle speed and elapsed travel time; and
   diminishing intensity of the displayed images independently, corresponding to the selected one of distance travelled, vehicle speed and elapsed travel time.

6. The non-transitory computer readable storage medium of claim 5 wherein the vehicle image sensor is a front-mounted camera.

* * * * *